INVENTOR.
EDITH CLAR - RENE ANTOINE PARIS

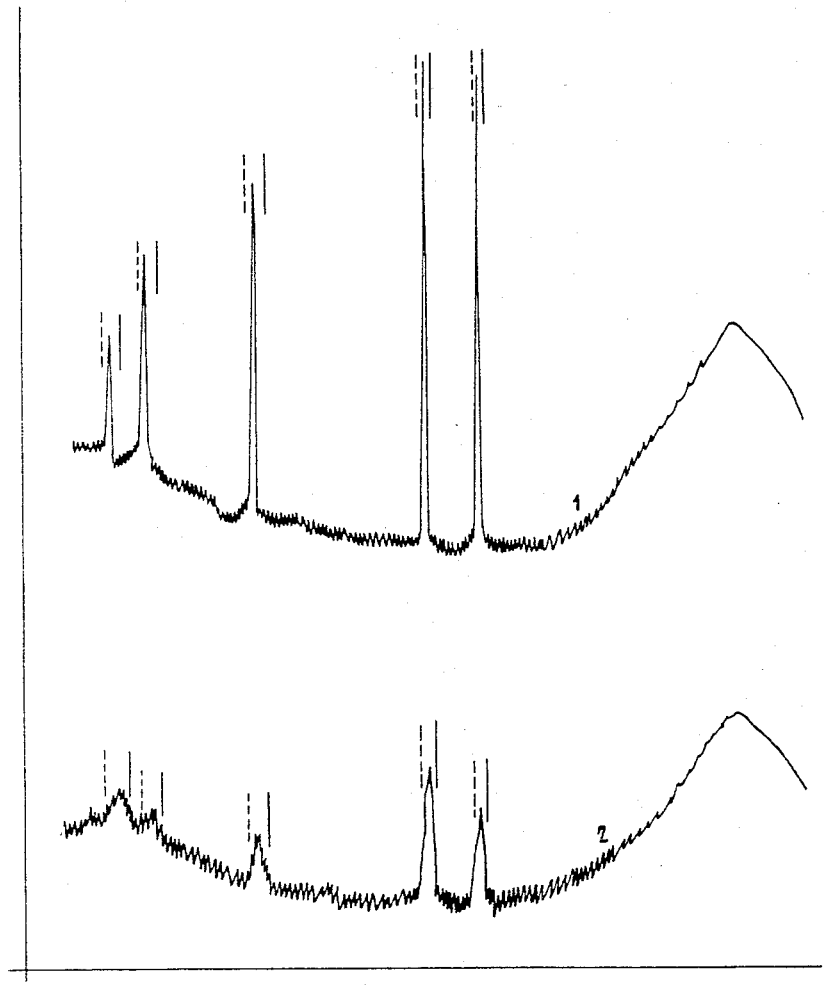
_Fig. 2_

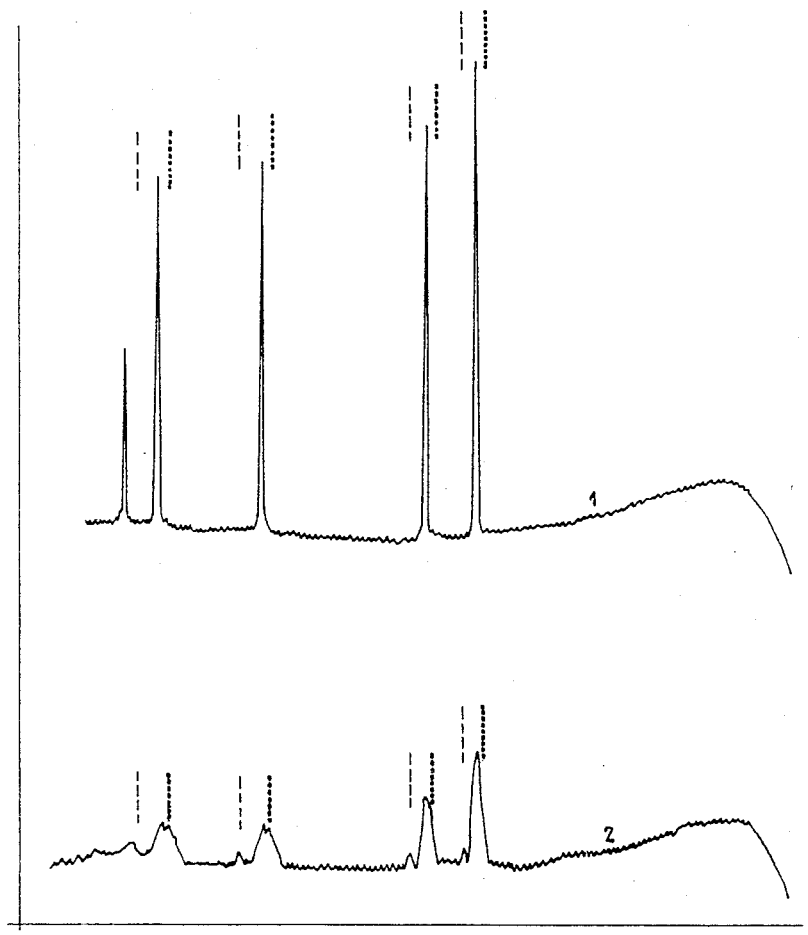
_Fig. 3_

— Fig. 4 —

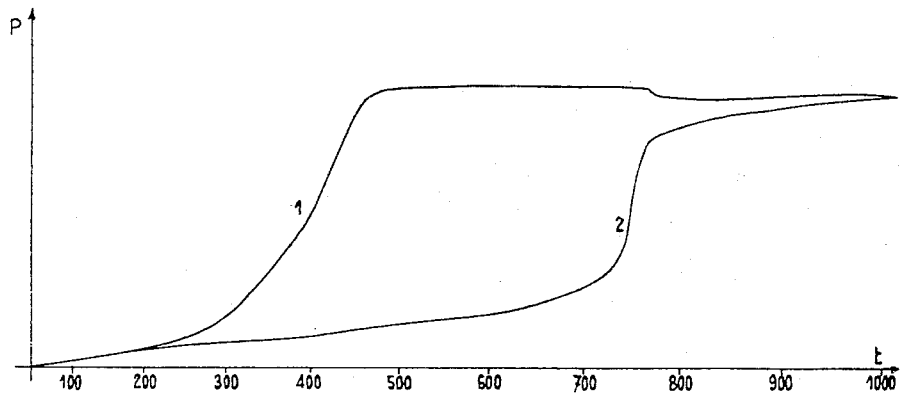
_Fig. 5_
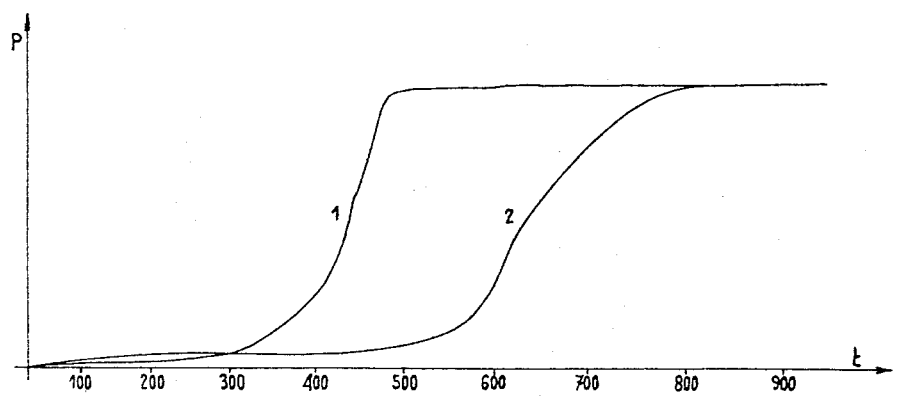
_Fig. 6_
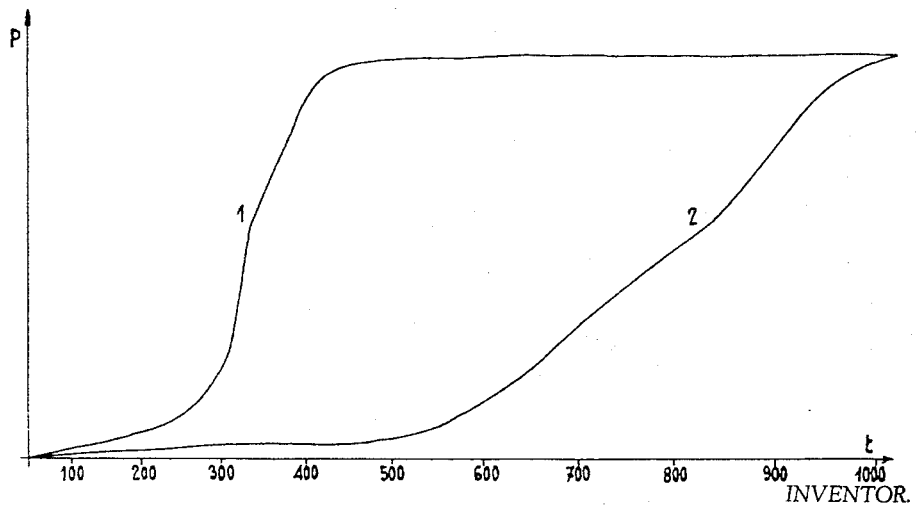
_Fig. 7_

United States Patent Office 3,380,839
Patented Apr. 30, 1968

3,380,839
SOLID SOLUTIONS OF FINE GRAIN METALLIC CARBIDES AND METHOD
Edith Clar and René Antoine Pâris, Lyon, France, assignors to Pechiney, Compagnie de Produits Chimiques et Electrometallurgiques, Paris, France
Filed Jan. 21, 1964, Ser. No. 339,202
6 Claims. (Cl. 106—43)

ABSTRACT OF THE DISCLOSURE

A process for the preparation of solid solutions of at least two of the carbides of titanium, tantalum and vanadium having a grain size of less than 1 micron by pyrolysis of organic salts of the metals at a temperature below 500° C. in the presence of methane and hydrogen to yield $Ti_2O_3$, $Ta_2O_5$ and $V_2O_3$, respectively, and reacting the product of the pyrolysis at a temperature within the range of 500–1050° C. in a mixture of hydrogen and methane.

This invention relates to solid solutions of fine grain carbides of titanium, tantalum, vanadium, and to processes of preparation of the same and to the uses and applications thereof.

As used herein, the term "solid solutions of metallic carbides" is meant to refer to a homogeneous phase having a proper atomic lattice containing, in variable proportions, two or more metallic carbides.

As used herein, the term "grain" dimensions of a product is meant to refer to the dimensions of the elementary crystals present in the particles of the product.

It is known to prepare solid solutions of metallic carbides by heating a mixture of the metallic oxides and carbon at a temperature of 1500–2000° C. in a hydrogen atmosphere.

According to the German Patent No. 720,502, one may prepare the solid solution by heating intimate mixtures of the carbides at 1600–2000° C. in a vacuum or under a protective gas.

Nowotny and Kieffer describe in "Metallforschung 2, 257 (1947)" the preparation of solid solutions by heating an intimate mixture of the carbides in the presence of a binder such as cobalt, nickel and the like, at a temperature of 1500–2100° C. in a vacuum.

According to Kieffer and Kolbl, "Powder Metall. Bull., 4/1 (1949), pp. 4 to 17," the solid solutions of two or more carbides can exhibit a technical value which is greater than that of single carbides for tools which are to be used in metal cutting. These authors have schematically indicated that TiC and TaC present between them a complete mutual solubility, in somewhat the same way as TiC and VC, and TaC and VC.

It has been found that the known processes for making the solid solutions lead to products having a relatively weaker reactivity and/or impurities and/or a coarse structure, any one of which may be found disadvantageous in the various uses that are to be made thereof.

The present invention has for its object the production of and the method of producing solutions, with fine grains having submicro dimensions, that is less than 1 micron, formed by at least two of the carbides of titanium, tantalum and vanadium, and which may contain as impurities one or more of the following bodies, including free carbon, the carbide of a metal entering into the constitution of the solid solution and/or the corresponding oxide.

Another object is to produce solid solutions of metal carbides of the type described in which the fine grain solid solutions may also contain, in solution, up to 10% by weight, and more particularly up to 5% by weight, of carbides of other transition metals, such as tungsten, molybdenum, niobium, etc.

Figure 1:
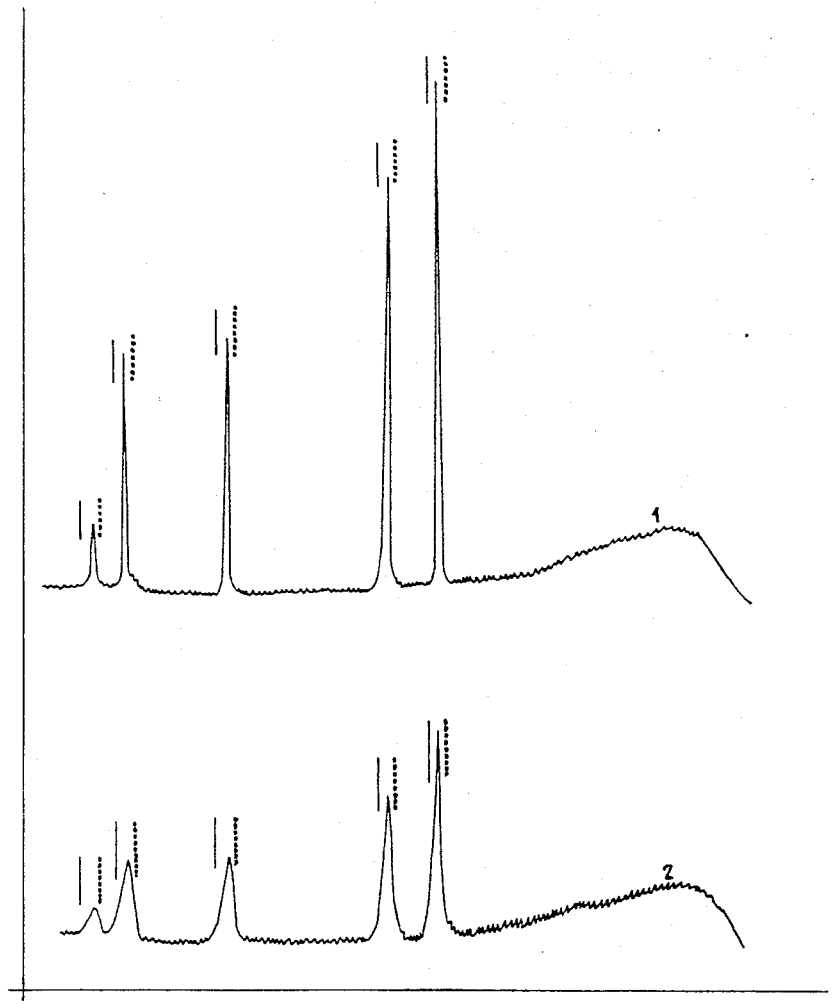

These and other objects and advantages will hereinafter appear and for purposes of illustration, but not of limitation, FIGS. 1 to 3 are spectrophotometric graphs of solid solutions some of which embody the features of this invention, and FIGS. 4 to 7 are graphs of thermogravimetry recordings taken of solid solutions some of which embody the features of this invention.

The existence of the solid solutions of this invention and the fineness of their grains may be established by radio-crystallography. The spectrophotometric recording of their Debye-Scherrer spectrum shows, in effect, the positions of diffraction lines intermediate between those of the corresponding simple carbides and widths of lines greater than those of the known solid solutions, as shown in a non-limiting way in FIGS. 1 to 3.

The graphs in FIG. 1 represent spectrophotometric recordings of Debye-Scherrer spectra corresponding to binary solid solutions of titanium and tantalum carbides with 50 atom percent of titanium, with curve 1 representing the solid solution prepared in accordance with the teachings of Nowotny and Kieffer supra, and with curve 2 representing the solid solution prepared in accordance with the practice of this invention.

Graphs 1 and 2 of FIG. 2 correspond in the same way to binary solid solutions of carbides of titanium and vanadium with 67 atom percent TiC prepared in accordance with the teachings of Nowotny and Kieffer (graph 1) and in accordance with the practice of this invention (graph 2).

In the same way, graphs 1 and 2 of FIG. 3 represent binary solid solutions of carbides of tantalum and vanadium with 50 atom percent TaC prepared according to Nowotny and Kieffer (graph 1), and in accordance with the practice of this invention (graph 2).

By contents in atoms per cent of the solid solutions of binary carbides, for example titanium in the solid solution of titanium and tantalum, reference is made to the ratio, expressed as a percentage of the number of atom-grams of titanium present in the starting material for the manufacture of the solid solution to the total number of atom-grams of titanium and tantalum present in the same starting material.

The positioning of the lines of simple carbides forming part of the solid solution are indicated by vertical lines in FIGS. 1 to 3, using solid lines for TiC, dotted lines for TaC, and broken lines for VC.

Figure 4:
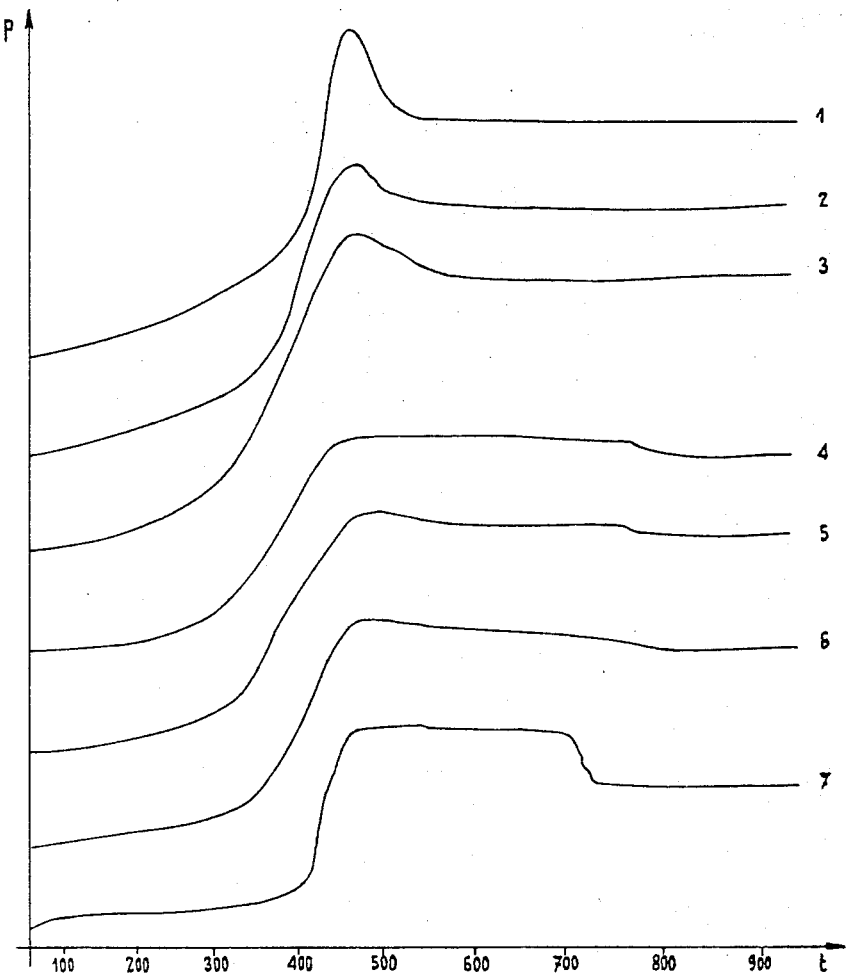

On graphs 2 of FIGS. 2 and 4, the positioning of the lines of simple carbides, in effect, frame the corresponding lines of the solid solution. On graph 2 of FIG. 3, one may note the simultaneous existence of the solid solution and of the simple carbides.

We have also established, particularly by thermogravimetry, that the solid solutions prepared in accordance with the practice of this invention have a chemical reactivity which is distinctly higher than that of the corresponding solid solutions prepared in accordance with heretofore known processes.

Thermogravimetry is a known analytical technique based on the use of a thermobalance allowing a sample to be weighed and heated to a temperature which may exceed 1000° C., measurements being made of its temperature and of variations in its weight as a function of the variations of its temperature, such recordings being made in a substantially continuous manner.

The results of this analysis, conducted in an oxidizing atmosphere, are shown in a non-limiting way by FIGS. 4 to 7, representing thermogravimetry recordings corresponding to binary solid solutions prepared in accordance with concepts of this invention as compared with solid solutions prepared in accordance with teachings of the prior art.

The following table gives, in atoms percent, the composition of the binary solid solutions corresponding to the carbides of FIGS. 4 to 7.

|  | Solid solutions based on— | Composition in atom percent | Remarks |
|---|---|---|---|
| Fig. 4: | | | |
| Graph 1 | Ti | 100% Ti plus 0% Ta | According to PV No. 923,009. |
| Graph 2 | Ti and Ta | 90% Ti plus 10% Ta | According to the invention. |
| Graph 3 | Ti and Ta | 75% Ti plus 25% Ta | Do. |
| Graph 4 | Ti and Ta | 50% Ti plus 50% Ta | Do. |
| Graph 5 | Ti and Ta | 25% Ti plus 75% Ta | Do. |
| Graph 6 | Ti and Ta | 10% Ti plus 90% Ta | Do. |
| Graph 7 | Ta | 0% Ti plus 100% Ta | According to PV No. 923,009. |
| Fig. 5: | | | |
| Graph 1 | Ti and Ta | 50% Ti plus 50% Ta | According to the invention. |
| Graph 2 | Ti and Ta | 50% Ti plus 50% Ta | According to the prior art. |
| Fig. 6: | | | |
| Graph 1 | Ti and V | 67% Ti plus 35% V | According to the invention. |
| Graph 2 | Ti and V | 50% Ti plus 50% V | According to the prior art. |
| Fig. 7: | | | |
| Graph 1 | Ta and V | 50% Ta plus 50% V | According to the invention. |
| Graph 2 | Ta and V | 50% Ta plus 50% V | According to the prior art. |

The abscissae correspond to temperatures in degrees Celsius, and the ordinates to the corresponding weights in percentages. The temperature was raised at the rate of 150° C. per hour. The heating took place in air. The graphs of the FIGS. 1 to 7 are all based on the taking of samples of 100 mg. of solid solutions or of carbides, as indicated.

The simple carbides, corresponding to the graphs 1 and 7 of FIG. 4, have been made in accordance with the teachings of our copending application Ser. No. 339,201, now abandoned, filed concurrently herewith and entitled "Manufacture of Fine Grain Metallic Carbides," which application corresponds to the French application No. PV 923,009, filed on Jan. 29, 1963. These graphs are given by way of comparison to show that the oxidation graps of the solid solution of this invention are intermediate between the oxidation graphs of the simple carbides.

The thermogravimetric graphs are reproducible and characteristic for a given product, when one replaces the thermobalance used by other known models, providing, of course, that the rate of temperature rise and the atmosphere of the reaction as well as the order of magnitude of the weight of the sample treated are the same.

According to a particular feature of this invention, the new solid solutions have thermogravimetric graphs which are substantially in conformity with those represented by their respective figures. One must, however, take account of the fact that an increase or a decrease of 100° C., approximately, in the temperature of preparation of the new solid solution, causes an increase or a decrease of approximately 20 and 50° C., respectively, in the starting and end temperatures of the combustion of said solid solution.

The results of the thermogravimetric analysis, conducted in an oxidizing atmosphere at a speed of temperature rise of 150° C. per hour, show that the solid solutions in conformity with the invention have the following characteristics taken in combination:

The temperature for the beginning of the increase in weight is below 400° C.;

The temperature for the end of the increase in weight is below 480° C.;

The spacing between the temperatures for the beginning and the end of the increase in weight does not exceed 130° C.;

The temperatures for the beginning and the end of the increase in weight correspond respectively to a break in the slope of the graphs, expressing the weight of the analyzed samples as a function of heating temperatures; that is to say, to the portions of these graphs where the variation in the slope passes through a maximum, these breaks or variations in slope being clearly shown by FIGS. 4 to 7.

We have established, by thermogravimetry, that the temperature for the start and the end of the increase in weight are lower and that the spacings between these temperatures are smaller than in the case of the corresponding known solid solutions, as shown by FIGS. 4 to 7.

FIGS. 4 and 5 also show that, in an atmosphere of air, the weight of the new solid solutions passes, in the case of the TaC-TiC system through a maximum and then decreases when the oxidizing temperature continues to increase. This unexpected phenomenon is capable of being explained by the fact that the new solid solutions free carbon during their combustion, and that this amorphous carbon then burns as the temperature approaches 450° C. for the binary solid solutions of carbides of titanium and tantalum with 90 and 75 atoms percent of titanium, and towards 750° C. for the binary solid solutions at 50, 25 and 10 atoms percent of titanium.

This freeing of carbon does not take place, in any way, for the corresponding binary solid solutions prepared according to the presently known methods.

The present invention has also for its object a process of manufacture of the new solid solutions of metallic carbides described above at temperatures which are distinctly lower than those employed in the known processes, and in which one passes a mixture of hydrogen and methane at a temperature which does not exceed 1050° C., and is preferably of the order of 1000° C., over oxidized compounds of the metals forming the solid solutions.

The said oxidized compounds are preferably manufactured by the pyrolysis, in an inert or reducing atmosphere, of organic salts of the metals syncrystallized or crystallized in intimate admixture.

According to a preferred feature of the invention, one effects the pyrolysis of these organic salts in an atmosphere of hydrogen and methane, and then one subjects the product of this pyrolysis to a carburizing treatment without allowing any intermediate cooling.

The new fine grain solid solutions containing, according to a particular feature previously described, up to 10% by weight of carbides of other transition metals such as tungsten, molybdenum, niobium, etc., may be prepared by adding to the said organic salts, organic salts of these transition metals.

The pyrolysis step of this invention is achieved at a relatively low temperature, below 500° C., and generally of the order of about 300° C. for best results, it is desirable to provide for a rate of temperature rise of the order of about 100° C. per hour between ambient temperature and the 300° C. or other pyrolysis temperature.

In accordance with the invention, use can be made of a mixture of hydrogen and methane in which the methane content does not exceed 10% by volume and which is preferably of the order of 2.5% to 4% by volume for carrying out the carburization step.

The oxides of titanium and tantalum $Ti_2O_3+Ta_2O_5$, as well as the oxides of vanadium and tantalum $$V_2O_3+Ta_2O_5$$

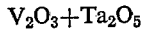

which, respectively, result from the pyrolysis of the initial organic salts, do not form solutions therebetween. We have, however, succeeded in preparing, starting from the mixtures of these materials, solid solutions at the relatively low temperatures of this invention, all of which constitutes an unexpected and desirable result.

The treatment at carburization temperature is continued for a period of time sufficient to provide for a substantially complete reaction.

About 1050° C. may be considered the upper limit for the carburization when use is made of the mixture of methane and hydrogen since temperatures above 1050° C. often result in the cracking of the methane, even when diluted with large amounts of hydrogen.

When, in the zone of relatively low temperatures, which is a distinctive feature of the invention, one lowers the temperature and/or the content in methane or the hydrogen-methane carburizing mixture, one diminishes at the same time, so as eventually substantially to eliminate, the content in free carbon of the solid solution of carbide product.

One may, according to a feature of the invention, effect the carburization in a mixed bed, the powdered starting material being placed in a container with a shape such that it can easily be crossed by the gaseous carburizing mixture.

One may also, according to the invention, effect the carburization in a fluidized bed, which allows continuous manufacture at a temperature which is more easily controllable and at a speed of carburization which is distinctly higher.

Preferably, both in the case of the fixed bed and in the case of the fluidized bed, it is desirable to recycle the gases after carburization with the addition of hydrogen for readjustment of the hydrogen to the desired level. In this way, the desired results can be obtained in a more efficient and in a more economical way.

The solid solutions of this invention are powdered and of much finer grain than those which can be obtained by the methods of the prior art and they can further be easily reduced by grinding to an extremely fine powdered state by reason of their texture. The products of this invention are capable of a number of valuable applications in which their fineness of grain plays an important role.

In certain purely chemical applications, use can be made of the particular chemical reactivity of the products of the invention which translates itself into a high speed of reaction in the solid state on other powdered products, after possible compression of the powders which are at first intimately mixed together.

The sintering aptitude of these solid solutions, either alone or in the presence of additives, such as metals or oxides, is also quite remarkable being generally increased by the fineness of grain.

In the sintering field, the intimate mixtures of these fine solid solutions with powdered oxides may easily lead to composite materials of the "Cermets" type whose abrasive or refractory properties have numerous applications.

It is equally important to indicate the ease with which these fine powders may be incorporated, in the hot state, into metals or alloys to create, according to the known techniques, a surface hardness on certain parts subject to wear.

Finally, in all the cases in which solid solutions of carbides may be used as catalysts, or as catalyst supports, or as constituents of mixtures with catalytic properties, the fineness, the specific surface area and the state of high division of the solid solution of the invention are generally favorable factors.

The following examples for making the new solid solutions are given by way of ilustration, but not by way of limitation:

EXAMPLE 1

The starting materials for the manufacture of a solid solution of carbides of titanium and of tantalum, in conformity with the invention, are the hydroxide of titanium (formula: $TiO_2nH_2O$) and that of tantalum (formula: $Ta_2O_5nH_2O$), freshly precipitated. The binary mixture of these hydroxides contains 50 atom percent of titanium, $n$ representing integral numbers.

These hydroxides are dissolved in a boiling solution of ammonium oxalate present in an amount in excess of the stoichiometric proportions, and one obtains thus a simultaneous dissolution of titanium and ammonium oxalate and of the oxalate tantalate of ammonium.

This solution, evaporated under a reduced pressure, results in crystallization of an intimate mixture of the two salts. The residue of this evaporation is heated in a furnace through which hydrogen is passed at a rate of 30 litres per hour and methane gas at a rate of one litre per hour.

The temperature is raised from 20° C. to 300° C. in three hours. The result of this first stage of thermal treatment is an intimate mixture of the oxides $Ti_2O_3+Ta_2O_5$. This is followed by an increase in temperature up to 1000° C. in one-half hour which temperature is maintained for 16 hours.

The radiocrystallographic analysis of the product obtained is illustrated by the graph 2 of FIG. 1 and the thermogravimetric analysis by the graph 4 of FIG. 4.

EXAMPLE 2

The starting materials for the manufacture of a solid solution of carbides of titanium and vanadium in conformity with the invention are the hydroxide of titanium ($TiO_2$, $nH_2O$) and the metavanadate of ammonium ($NH_4VO_3$).

These compounds are dissolved in a boiling solution of ammonium oxalate in slight excess relatively to the stoichiometric proportions and there is obtained a simultaneous dissolution of titanium and ammonium oxalate and of the oxalate of vanadium and ammonium.

This solution, evaporated under a reduced pressure, leads to the syncrystallization of the two salts. The residue of this evaporation is heated in a furnace in the presence of hydrogen and methane at a rate of 30 litres per hour of hydrogen and 1 litre per hour of methane. The temperature is raised from 20° C. to 300° C. in three hours. The result of this first stage of thermal treatment is a solid solution of the oxides $Ti_2O_3$ and $V_2O_3$.

The temperature is then increased up to 1000° C. in one-half hour, a temperature which is maintained for 16 hours.

The radiocrystallographic analysis of the product obtained in the case of a content of 67 mole percent of TiC is illustrated by the graph 2 of FIG. 2 and its thermogravimetric analysis corresponds to the graph 1 of FIG. 6.

EXAMPLE 3

The starting materials for the manufacture of a solid solution of carbides of tantalum and vanadium, in conformity with the invention, are tantalum hydroxide ($Ta_2O_5nH_2O$) and the metavanadate of ammonium ($NH_4VO_3$). One effects a mixture of these compounds which corresponds to 50 atom percent of tantalum.

These compounds are dissolved in a boiling solution of ammonium oxalate in excess of the stoichiometric proportions to effect a simultaneous dissolution of ammonium oxalate-tantalate and of the oxalate of vanadium and ammonium.

This solution, evaporated under a reduced pressure, leads to the crystallization of an intimate mixture of the two salts. The residue of this evaporation is heated in a furnace with a rate of 30 litres of hydrogen per hour and of 1 litre of methane per hour.

It is heated from 20° C. to 300° C. for three hours. The result of this first stage of the thermal treatment is an intimate mixture of the oxides $Ta_2O_5$ and $V_2O_3$. This is followed by increase in temperature to 1000° C. in one-half hour, a temperature which is maintained for 16 hours.

The crystallographic analysis of the product obtained is illustrated by the graph 2 of FIG. 3 and the thermogravimetric analysis by the graph 1 of FIG. 7.

EXAMPLE 4

The starting materials for the manufacture of a ternary solution of carbides of tantalum, titanium and vanadium, in conformity with the invention, are the hydroxides of tantalum ($Ta_2O_5 nH_2O$) and of titanium ($TiO_2 nH_2O$) and the metavanadate of ammonium ($NH_4VO_3$).

One effects a mixture of these different products so as to form the following composition: Ti: 60 atoms percent—V: 20 atoms percent—Ta: 20 atoms percent. They are dissolved in a boiling solution of ammonium oxalate present in excess of the stoichiometric proportions and one obtains, thus, a simultaneous dissolution of the oxalate of ammonium, of the oxalate of vanadium and ammonium and of the oxalate of titanium and ammonium and oxalate of tantalum and ammonium.

This solution, evaporated under reduced pressure, leads to the crystallization of an intimate mixture of ammonium oxalate-tantalate and of mixed crystals of vanadium and ammonium oxalate and of the oxalate of titanium and ammonium.

The residue of this evaporation is heated in a furnace with hydrogen and methane at a rate of 30 litres hydrogen per hour and of 1 litre methane per hour.

It is heated from 20° C. to 300° C. in three hours. The result of this first stage of thermal treatment is an intimate mixture of the oxide $Ta_2O_5$ and of a solid solution $Ti_2O_3$-$V_2O_3$.

One continues the increase in temperature up to 1000° C. in one-half hour, a temperature which is maintained for 16 hours. The crystallographic examination of the product obtained shows that one is faced with a homogenous solid solution whose lines are of a width which is comparable with that of the solid solutions of TiC-TaC of Example 1.

It will be understood that changes may be made in the details of formulation, method of manufacture and use without departing from the spirit of the invention, especially as defined in the following claims.

We claim:

1. A process for the preparation of solid solutions of at least two carbides having a grain size below 1 micron and selected from the group consisting of the carbides of titanium, tantalum and vanadium, consisting essentially of pyrolyzing the syncrystallized organic salts of the metals in an atmosphere of methane and hydrogen at a temperature below 500° C. to yield $Ti_2O_3$, $Ta_2O_5$ and $V_2O_3$, respectively, and reacting the product of the pyrolyzation reaction with a mixture of hydrogen and methane at a temperature above 500° C. but which does not exceed 1050° C.

2. A process for the preparation of solid solutions of at least two carbides having a grain size below 1 micron and selected from the group consisting of the carbides of titanium, tantalum and vanadium, consisting essentially of pyrolyzing organic salts of the metals in intimate mixture in an atmosphere of methane and hydrogen and at a temperature below 500° C. to yield $Ti_2O_3$, $Ta_2O_5$ and $V_2O_3$, respectively, and reacting the product of the pyrolyzation reaction with a mixture of hydrogen and methane at a temperature above 500° C. but which does not exceed 1050° C.

3. The process as claimed in claim 2 in which the product of the pyrolysis is reacted in the presence of methane and hydrogen at a temperature of about 1000° C.

4. The process as claimed in claim 3 in which the methane content does not exceed 10% by volume of the gaseous mixture of methane and hydrogen.

5. The process as claimed in claim 4 in which the methane content is within the range of 2.5% to 4%.

6. A process for the preparation of solid solutions of at least two carbides having a grain size below 1 micron and selected from the group consisting of the carbides of titanium, tantalum and vanadium, consisting essentially of pyrolyzing organic salts of the metals crystallized together in intimate mixture in an atmosphere of methane and hydrogen and at a temperature below 500° C. to yield $Ti_2O_3$, $Ta_2O_5$ and $V_2O_3$, respectively, and reacting the product of the pyrolyzation reaction with a mixture of hydrogen and methane at a temperature above 500° C. but which does not exceed 1050° C.

References Cited

UNITED STATES PATENTS

| | | | |
|---|---|---|---|
| 3,077,385 | 2/1963 | Robb | 23—208 |
| 2,741,828 | 4/1956 | Matthew et al. | 29—191.2 |
| 2,746,134 | 5/1956 | Drummond | 29—191.2 |
| 2,787,634 | 4/1957 | Golwynne | 75—.5 |
| 2,861,880 | 11/1958 | Hannon | 75—.5 |

FOREIGN PATENTS 778,267   7/1957   Great Britain.

OTHER REFERENCES

Schwarzkopf, P.: "Refractory Hard Metals," New York, Macmillan Co., 1953, p. 175–6.

HELEN M. McCARTHY, *Primary Examiner.*

HYLAND BIZOT, RICHARD O. DEAN, *Examiners.*